United States Patent Office 2,711,504
Patented June 21, 1955

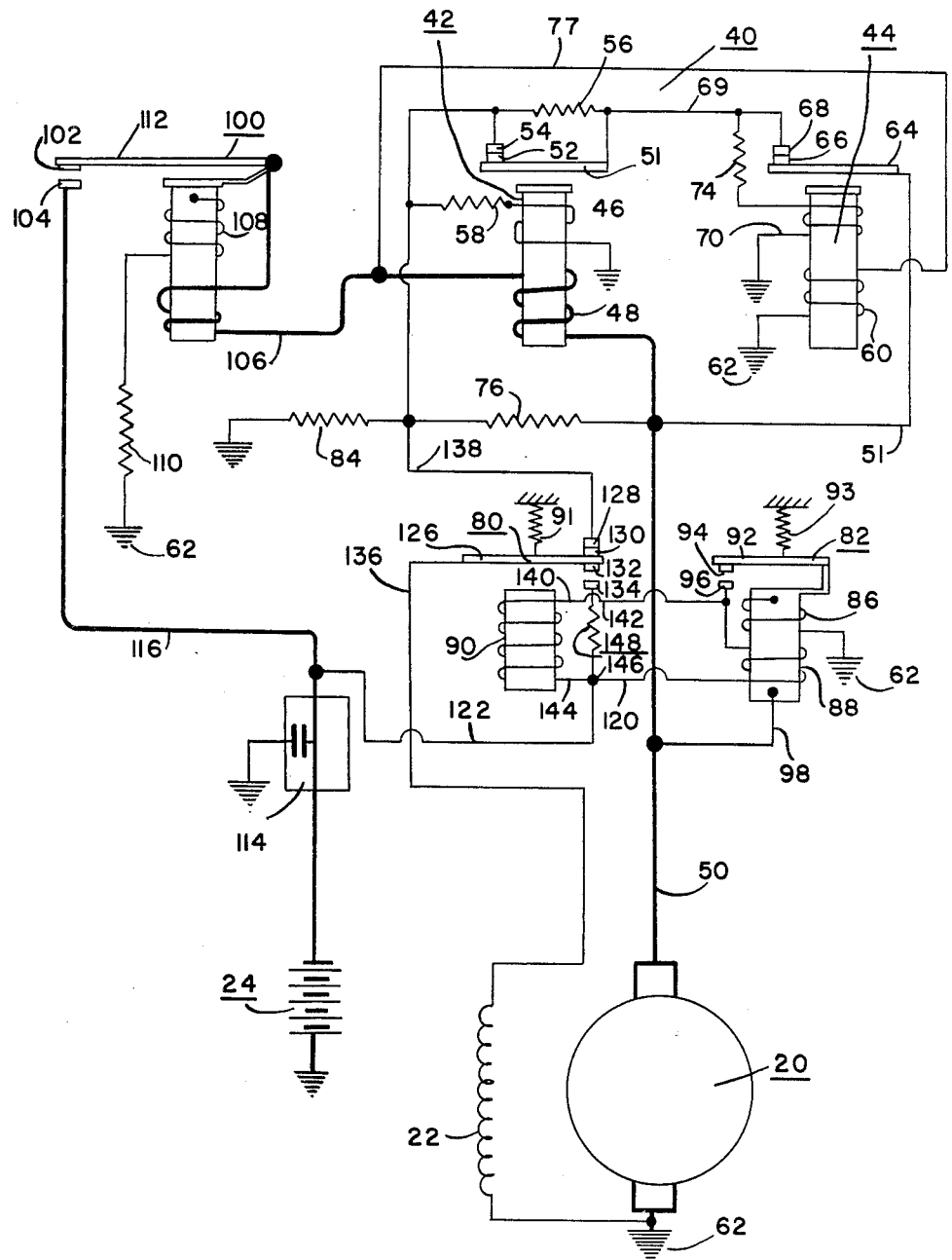

2,711,504

BATTERY CHARGING SYSTEM

Charles W. King, Anderson, Ind., assignor to General Motors Corporation, Detroit, Mich., a corporation of Delaware Application March 26, 1954, Serial No. 418,839

6 Claims. (Cl. 320—25)

This invention relates to generator circuits and particularly to a system wherein the polarity of the shunt field D. C. generator is controlled.

It is an object of the present invention to eliminate generator and/or current and voltage regulator failures in a battery charging system which result when the polarity of the battery and generator is not in agreement.

It is another object of the present invention to eliminate failures in a D. C. shunt field generator and a current and voltage regulator therefor which results when the battery, which the generator is to charge, is incorrectly connected in the system.

In carrying out the above objects it is another object to provide a polarizing relay in a battery charging system so that the field of a D. C. shunt wound generator, used for charging the battery, will be reversed whenever the polarity of the generator and battery are not in agreement.

In carrying out the above objects, a more specific object is to provide a relay in a battery charging system that is responsive to either the battery or generator voltage to close a circuit to a second relay that closes a circuit, when the algebraic difference of the generator and battery potential exceeds a predetermined value, between the battery and generator field for reversing the polarity of the field and thereby causing the generator and battery polarity to agree.

Difficulties are frequently encountered when a battery is connected in a circuit with a generator in a charging system with its polarity reversed from that of the generator. This incorrect connection frequently occurs when motor vehicles are stored and when an external power supply is used for starting, or when batteries are initially installed incorrectly. In instances when the battery and generator polarity do not agree, and no provision is made to correct the same before starting, it has been found that the regulator cut-out relay contacts frequently weld together so that the battery will discharge through the generator armature after the vehicle engine is turned off. This frequently results in the damage to either or both the generator and voltage and current regulator. It is to the elimination of the above difficulties that the present invention is directed.

Further objects and advantages of the present invention will be apparent from the following description, reference being had to the accompanying drawings wherein a preferred embodiment of the present invention is clearly shown.

In the drawing the single figure shown illustrates a battery charging system according to the present invention.

In the drawing, the generator 20 and its shunt field 22 is connected in circuit that includes a current and voltage regulator 40, a cut-out relay 100, and battery 24. Included also in the circuit is a polarizing relay 80 and and actuating relay 82 as will be hereinafter described as these constitute one of the essential features of the present invention.

The regulator 40, which comprises a current responsive relay 42 and a voltage responsive relay 44, controls the excitation of the field 22 as will be hereinafter apparent.

The current regulator relay 42 comprises; a series winding 48, a reverse winding 46, and a movable armature 51 carrying a movable contact 52 which cooperates with a stationary contact 54. A spring, not shown, on armature 51 normally urges the movable contact 52 toward and into contact with the stationary contact 54 to complete a circuit through the armature which shorts out a resistance 56. The windings 46 and 48 are wound on a common core. When the current in winding 48 has reached a predetermined value, the magnetic attraction induced in the core will attract and move armature 51 to open contacts 52 and 54 and cause the resistance 56 to be included in the field 22 circuit to reduce the exciting current in field 22 and thereby correspondingly decrease the output of generator 20. A resistance 58 in series with winding 46, is normally in circuit with field 22. When the contacts 52 and 54 open and resistance 56 is placed in the field 22 circuit, the resistances 56 and 58 are connected in parallel in the circuit. The opening of the contacts 52 and 54 causes an inductive voltage to be set up in field 22. This inductive voltage sets up a reverse flow of current in winding 46 which causes the magnetic attraction of the core of relay 42 to rapidly decrease in intensity and provides for a more rapid response in relay 42.

The voltage responsive relay 44 has a shunt winding 60 in series in a circuit that includes lead 50, lead 77, winding 60 and ground 62. The winding 60 is responsive to the potential across generator 20, output terminals. The voltage regulator 44 comprises; the shunt winding 60, a reverse winding 70, and a movable armature 64 carrying a movable contact 66 which cooperates with a stationary contact 68. A spring, not shown, on armature 64 normally urges the movable contact 66 toward and into contact with the stationary contact 68. Thus when the generator voltage output of generator 20 exceeds a predetermined amount, the magnetic attraction as caused by the current in the winding 60 will overcome the tension of the spring and cause the armature 64 to separate contacts 66 and 68 and thereby open a circuit that shunts a regulating resistance 76 from the field 22 circuit. The reverse winding 70 and the resistance 74 of relay 44 are normally in circuit when contacts 66 and 68 are closed and are responsive to the voltage across the field 22. When contacts 66 and 68 are open, winding 70 has a reverse current induced therein because of the induced voltage as set up in field 22 when the contacts open. This reverse current in winding 70 opposes the magnetic attraction of the shunt winding 60 and thereby provides a more rapid action to the closing of the contacts 66 and 68 as the magnetic attraction of the shunt winding 60 decreases due to the decrease in generator 20 output.

From the above arrangement of parts it is manifest that the regulator 40 will operate as follows; as the current and voltage output of generator 20 increases beyond a predetermined limit, the voltage thereof will be controlled by the voltage responsive relay 44 when the effective magnetic attraction in the core induced by the current in the shunt winding 60 increases until the predetermined voltage thereof is reached. At this point there is sufficient magnetism to overcome the armature spring, not shown, and the armature 64 is attracted toward the core and the contact points 66 and 68 are opened. The opening of the contact points 66 and 68, which normally shunt resistance 76, causes reverse current to be passed through the reverse winding 70 which current sets up a magnetic field in opposition to that of the shunt winding 60 and repels the armature and thereby causes the voltage regulator to have a rapid vibrating operation. During the period when the contact points 66 and 68 are open, as caused by the magnetic attraction of shunt winding 60, the resistance 76 will be included between the output lead 50 of generator 20 and the field 22 so as to decrease the excitation of field 22 and thereby lower the output of the generator 20. This reduced output of generator 20 will correspondingly decrease the excitation of the shunt winding 60 and reduce the magnetic attraction thereof on armature 64 to cause the contacts 66 and 68 to close and thereby cause the strength of the field 22 to increase so as to return the output of generator 20 to a higher potential.

As the voltage responsive relay 44 is used to control the voltage output of generator 20 so also does the current responsive relay 42 control the current output of generator 20.

The current regulator relay 42 contains two windings 46 and 48 which are wound on the relay 42 core so that their magnetic attraction aids each other. When the current in generator 20 output lead 50 exceeds a predetermined amount, contacts 102 and 104 of cutout relay 100 will close in a manner that will be hereinafter described, and the series coil 48 will attract the movable armature 51 and open the circuit across contacts 52 and 54 so that the resistance 56 is included in the field circuit. When this occurs the excitation of field 22 is decreased and the current output of generator 20 is correspondingly lowered so that the magnetic attraction of coil 48 will be decreased and the contacts 52 and 54 will again close and shunt resistance 56 from the field circuit. It is readily apparent from the drawing, when contacts 52 and 54 are open, resistance 58 and coil 46 will have a reverse current therein as heretofore described. Thus the operation of both the current and voltage relays will be very rapid and a very close control of the current and voltage output of generator 20 will be realized. In connection with the above regulator 40 the resistance 84 is utilized in the conventional manner to reduce the arcing at contacts 52 and 54 and contacts 66 and 68 when they open.

The cutout relay 100 includes; a series winding 106, a shunt winding 108 assembled on the core with the series winding 106, and a movable armature 112. The armature 112 carries a movable contact 102 that cooperates with a stationary contact 104. The armature normally is held by a suitable spring means, not shown, so the contacts 102 and 104 are separated. The series winding 106 is connected in series with the generator charging circuit so that the generator output will pass therethrough when the points 102 and 104 are closed. The shunt winding 108 is connected in series with a resistance 110 to ground 62 and is thus shunted across the generator so that the generator voltage is imposed across the winding 108 and resistance 110 at all times. When the generator 20 voltage builds up to a value sufficient to a predetermined value, a sufficient current will flow in shunt winding 108 to induce a magnetic attraction in the relay 100 core to overcome the tension of the armature spring, and the armature will move to bring points 102 and 104 into contact with each other and complete the circuit between the generator 20 and battery 24 and cause current flow through the series winding 106 to aid the magnetic attraction induced by the shunt winding 108 and maintain the contact points 102 and 104 closed so that the circuit between the generator 20 and battery 24 may be controlled by the voltage and current regulator 40 as heretofore described.

When the generator 20, slows down or stops, the current tends to reverse from the normal charging direction between battery 24 and generator 20. This reversal of current through the relay series winding 106 causes a reversal of the magnetic effect produced by this winding. At this time the magnetic field of the shunt winding 108 is not reversed and the magnetic fields of the two are in opposition. As a consequence the resultant magnetic field is insufficient to hold the armature 112 against the tension of the armature spring and contacts 102 and 104 open to break the circuit between the generator 20 and battery 24.

A feed-through capacitor 114 which is located on the lead 116 between the cutout relay 100 and battery 24 is used to minimize radio interference noises, and may be of any of the well-known types.

As heretofore set forth the present invention is directed to a system wherein the polarity of the battery and the generator are in constant agreement. To accomplish this objective the polarizing relay 80 and actuating relay 82 are included in the system as will become hereinafter apparent.

So that the operation of the relays 80 and 82 may be better understood, the battery 24 will be designated as having 24 to 25 volts and the generator 20 of a capacity sufficient to charge the battery.

Relay 82 includes windings 86 and 88 each wound on a common core and a movable armature 92 carrying a movable contact 94 which cooperates with a stationary contact 96. A spring 93 attached to armature 92 normally urges the armature 92 to separate contacts 94 and 96 when no current passes through windings 86 and 88. Winding 86 is connected through a lead 98 with armature terminal lead 50 through the core of the relay 82 to ground 62 so that the winding 86 is responsive to the voltage output of generator 20. Winding 88 has one end connected through leads 120 and 122 with the battery terminal lead 116 and the other end connected to stationary contact 96 so that the winding 88 is responsive to the battery voltage when contacts 94 and 96 are closed so as to complete the circuit including contact 94, the armature 92, the relay 82 core, and winding 86 to the battery and ground 62.

The winding coil 90 for the polarizing relay 80 is adapted when excited to move an armature 126 that is normally spring biased by a spring 91, so that the connection between contact 130, carried on armature 126, and a stationary contact 128 is broken and a connection between contacts 132, carried on armature 126, and stationary contact 134 is formed. Armature 126 is electrically connected through a lead 136 to field 22 and thus may selectively connect the field 22 to either of the circuits associated with stationary contacts 128 and 134. Lead 138 that terminates in stationary contact 128 is connected through the voltage regulator, hereinbefore described, so that resistances 76 and 56 may be inserted or omitted from the circuit and vary the current passing therethrough depending upon the output of current and voltage as produced by generator 20. One end 140 of the polarizing relay winding 90 is connected with the generator lead wire 50 through a circuit that includes wire 142, closed contacts 94 and 96, the movable armature portion 92 of relay 82, the core of that relay and wire 98 which is secured to the core. The other end 144 of the core winding 90 is connected at a junction 146 to wire 122 which in turn is connected with a battery wire 116. By the above arrangement of parts the end 140 of the core winding has the generator 20 voltage impressed thereon when contacts 94 and 96 are closed and the other end 144 has the battery voltage impressed thereon.

With the above arrangement of parts in mind, the function of the polarizing relay 80 and its actuating relay 82 will be set forth when the generator and battery polarity disagree. When this condition occurs, the generator will begin to produce current and voltage in a conventional manner until relay 82 closes. The voltage required to close this relay because of the selection of winding 86 will be approximately 15 volts. As heretofore stated winding 88 is disposed on the relay 82 core so that it will aid the winding 86 if the generator and battery potential do not agree. Coil 88 is also adapted to actuate the relay when the voltage impressed exceeds 20 volts and will aid the winding 86 to hold the armature 92 of the relay 82 to maintain contacts 94 and 96 closed and impress the generator 20 voltage of 15 volts on the end 140 of coil winding 90 of the polarizing relay 80. Simultaneously with the impression of this generator voltage of 15 volts, a battery voltage of 24 to 25 volts, which has the opposite polarity to that of the generator voltage will be impressed on end 144 of the winding 90. Thus the total resultant potential across the winding 90, as determined by the algebraic difference of the generator and battery voltages, i. e., 25 and 15, is approximately 40 volts which is sufficient to actuate the armature 126 of relay 80. When the armature 126 is moved the connection between contacts 128 and 130 is broken and the connection between contacts 132 and 134 formed so that the field circuit through wire 138 is broken and the generator field is connected with the battery 24 through a circuit that includes; wire 116, wire 122, junction 146, resistance 148, contacts 132 and 134, the movable armature 126 and wire 136 which leads to the field 22. This connection of the battery 24 with the generator field 22 will immediately deenergize the generator 20 so that only the battery voltage will hold relays 82 and 80 in an energized position. A further impression of the battery 24 voltage across the field 22 will cause the generator 20 to be repolarized to agree with the battery 24 polarity and permit the generator 20 to produce a voltage that is in agreement with the battery 24, and cause the algebraic difference in voltage between the ends 140 and 144 of winding 90 to decrease to a point less than necessary to hold armature 126, and permit the armature 126 to move to the deenergized position. When the armature 126 moves to a deenergized position contacts 128 and 130 will close to complete the field circuit through lead 138 which includes the regulator 40 in the field circuit whereby the voltage and current regulation is accomplished in a normal manner with the generator 20 now producing current and voltage in agreement with the polarity of battery 24.

When the polarity of battery 24 and generator 20 is in agreement, the generator 20 voltage will build up in a normal manner and when the generator output reaches approximately 15 volts, the winding 86 will actuate the armature 92 of relay 82 and close the circuits between contacts 94 and 96 and thereby impress the generator voltage of 15 volts on the terminal end 140 of winding 90. Since the battery polarity agrees with the generator and is approximately 24 to 25 volts, there is only approximately 10 volts difference between the winding ends 144 and 140 on coil 90. This differential, initially insufficient to actuate the armature 126 of relay 80, becomes smaller as the generator 20 output continues to increase until the points 102 and 104 of cutout relay 100 close. At this point all potential is removed from the ends 140 and 144 of the coil 90 of polarizing relay 80 and full spring tension is applied on armature 126 to insure pressure between contacts 128 and 130 and the system continues to generate voltage and current in the conventional manner. A resistance 148 is included in the circuit to reduce the inductive arcing at the contacts 132 and 134 when they open caused by induced voltage in field coil 22.

As heretofore stated a 24 volt battery was chosen for the purposes of illustration only and in this connection the voltages necessary to cause the windings to actuate the armatures associated therewith are as follows:

| | |
|---|---|
| Winding 86 | volts 15 |
| Winding 88 | do 20 |
| Winding 90 | do 30 |
| Resistance 148 | ohms 2 |

It is apparent that other values might be selected and batteries having a higher or lower potential might be charged by a generator that is selected in size for the particular application involved.

Further it is also apparent the battery 24 might be replaced by a D. C. generator in which case the generators would be automatically circuited with each other so their polarity would be in agreement, in the manner heretofore set forth.

While the embodiment of the present invention as herein disclosed, constitutes a preferred form, it is to be understood that other forms might be adopted.

What is claimed is as follows:

1. In a battery charging system, the combination comprising; a storage battery, a D. C. generator having a shunt field, and means connected with and responsive to the difference in polarity between said generator and battery for connecting the battery to said field for reversing the polarity of said generator.

2. In a battery charging system, the combination comprising: a storage battery, a D. C. generator having a shunt field, and means connected with and responsive to the algebraic difference in polarity of said generator and battery for connecting the battery to said field for reversing the polarity of said field and causing the polarity of the battery and generator to agree.

3. In a battery charging system, the combination comprising; a storage battery, a D. C. generator having a shunt field, and means connected with said battery and generator and responsive to the difference in polarity therebetween for connecting the battery to said field for reversing the polarity of said generator.

4. In a battery charging system, the combination comprising; a storage battery, a D. C. generator having a shunt field, a relay having a winding connected with and responsive to the algebraic difference in potential of said battery and generator and arranged to connect the field of said generator with said battery in response to said difference, whereby the polarity of the field of said generator is reversed and the polarity of said generator and battery agree.

5. In a battery charging system, the combination comprising; a storage battery, a D. C. generator having an armature and shunt field, a relay in circuit with and responsive to the potential of said generator armature, a second relay having a winding in circuit with said first relay and with said generator armature, said second relay winding also being in circuit with said battery and arranged to be responsive when the algebraic difference in potential between said battery and generator exceeds the predetermined value for connecting said battery to said field whereby the polarity of the field of said generator is reversed for reversing the polarity of said generator.

6. In a battery charging system, the combination comprising; a storage battery, a D. C. generator having an armature connected to said battery through a circuit including a current and voltage responsive regulator and a cut-out relay, a shunt field for exciting said armature, a relay in circuit with said field for connecting said generator and said battery in circuit with said field, a second relay in circuit with said armature arranged to connect one end of a coil of said first relay in circuit with said armature when the armature potential exceeds the predetermined value, said coil of said second relay having its other end in circuit with said battery whereby said first relay is actuated when the algebraic difference of the armature and battery potential exceeds a predetermined value for connecting said battery and said field in circuit with each other whereby the polarity of said field and generator is reversed.

References Cited in the file of this patent

UNITED STATES PATENTS

| | | |
|---|---|---|
| 1,304,934 | Bijur | May 27, 1919 |
| 1,898,559 | McNeil | Feb. 21, 1933 |
| 2,031,784 | McNeil | Feb. 25, 1936 |
| 2,624,870 | Kolando et al. | Jan. 6, 1953 |
| 2,627,038 | Miner, Jr., et al. | Jan. 27, 1953 |